(12) United States Patent
Bourgeois, Jr.

(10) Patent No.: US 10,344,577 B2
(45) Date of Patent: Jul. 9, 2019

(54) SYSTEM AND CONTROL METHOD TO IMPROVE THE RELIABILITY AND RANGE OF MINERAL INSULATED ELECTRICAL CABLES

(71) Applicant: Lee Joseph Bourgeois, Jr., The Woodlands, TX (US)

(72) Inventor: Lee Joseph Bourgeois, Jr., The Woodlands, TX (US)

(73) Assignee: PSPC, LLC, The Woodlands, TX (US)

( * ) Notice: Subject to any disclaimer, the term of this patent is extended or adjusted under 35 U.S.C. 154(b) by 750 days.

(21) Appl. No.: 14/480,302

(22) Filed: Sep. 8, 2014

(65) Prior Publication Data

US 2016/0072280 A1    Mar. 10, 2016

(51) Int. Cl.
*E21B 36/04*    (2006.01)
*E21B 43/24*    (2006.01)
*H02H 9/00*    (2006.01)
*H02H 9/04*    (2006.01)
*H02M 1/12*    (2006.01)
*H02H 7/22*    (2006.01)

(52) U.S. Cl.
CPC .......... *E21B 43/2401* (2013.01); *E21B 36/04* (2013.01); *H02H 9/005* (2013.01); *H02H 9/045* (2013.01); *H02H 7/226* (2013.01); *H02M 1/12* (2013.01); *H02M 1/126* (2013.01)

(58) Field of Classification Search
CPC .......... E21B 43/24–2401; E21B 36/04; H02H 9/005–007; H02H 9/045; H02H 7/226
See application file for complete search history.

(56) References Cited

U.S. PATENT DOCUMENTS

| 5,060,287 A | 10/1991 | Van Egmond |
| 5,099,918 A * | 3/1992 | Bridges ................. E21B 36/006 166/60 |
| 2001/0018981 A1 | 9/2001 | Yin et al. |

(Continued)

OTHER PUBLICATIONS

International Search Report and Written Opinion for International Application No. PCT/US2015/048966 dated Dec. 24, 2015.

*Primary Examiner* — Ronald W Leja
*Assistant Examiner* — Christopher J Clark
(74) *Attorney, Agent, or Firm* — C. Tumey Law Group PLLC

(57) ABSTRACT

Embodiments include a system, control process, and method for improving the reliability of mineral insulated electrical cables for use in oil and gas industry applications. The embodiments may include a PWM variable speed drive having an optimized operating frequency, a sine wave filter connected to an output of the drive and designed to mitigate reflective voltage wave spikes from the drive's PWM voltage pulses, a mineral insulated electrical heater cable connected to the filter, and an external controller for receiving voltage, current, and temperature feedback to create a voltage set point at which the drive operates. The embodiments may (i) mitigate common failure mechanisms of mineral insulated cables operating at a medium voltage level and in a temperature range of from 200° C. to 700° C.; (ii) extend the range of application of mineral insulated cables; and (iii) prevent high voltage spikes from causing damage to the insulant material of heater cables.

9 Claims, 1 Drawing Sheet

(56) References Cited

U.S. PATENT DOCUMENTS

2001/0032721 A1    10/2001   Rider et al.
2011/0247805 A1*   10/2011   De St. Remey .... E21B 43/2401
                                                                              166/272.1
2013/0309888 A1    11/2013   Nicholson

* cited by examiner

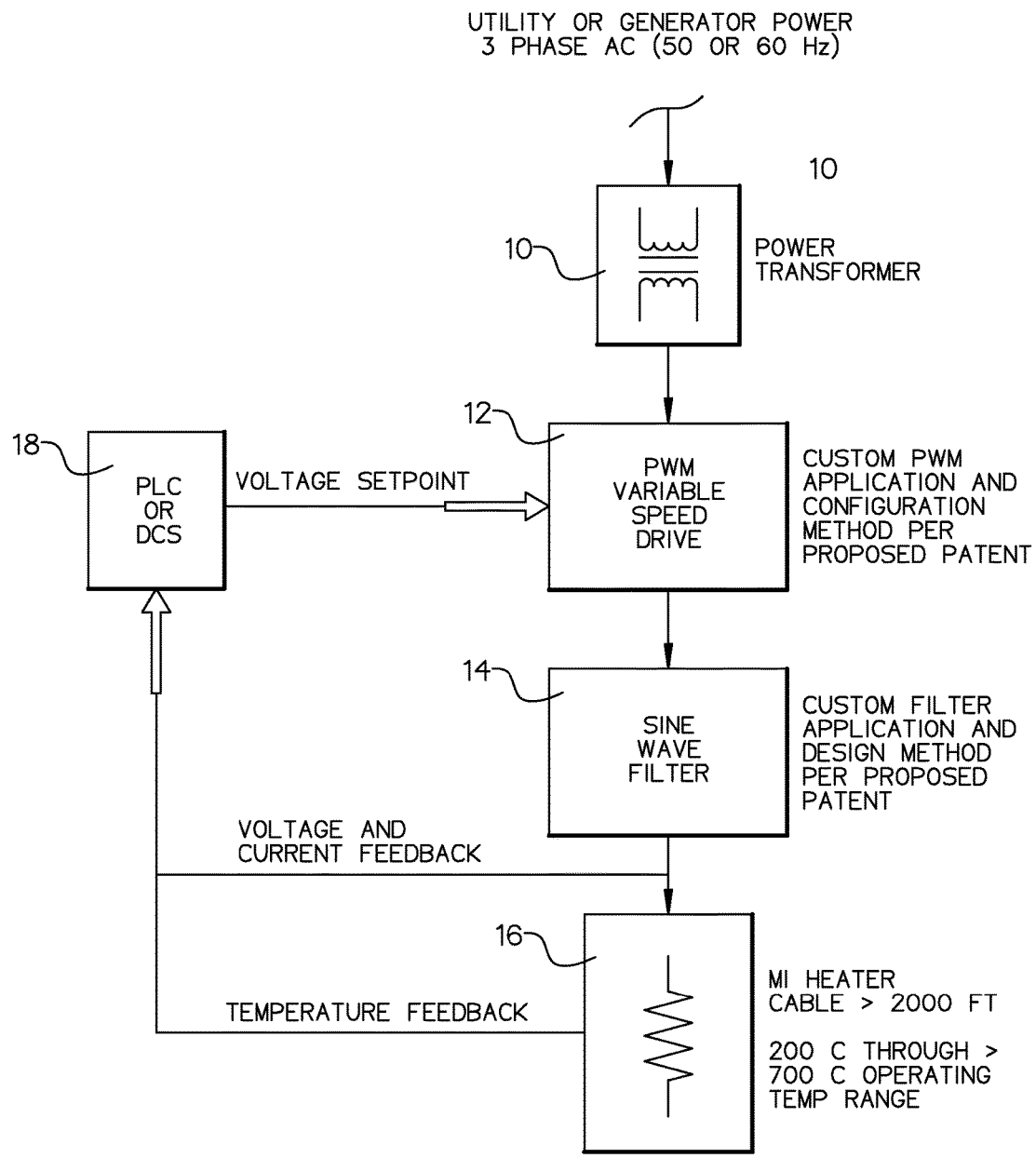

SYSTEM AND CONTROL METHOD TO IMPROVE THE RELIABILITY AND RANGE OF MINERAL INSULATED ELECTRICAL CABLES

BACKGROUND

The embodiments herein relate generally to mineral insulated electrical cables, and more particularly, to a method for extending both the operating life and range of medium voltage mineral insulated electrical cables in high temperature environments.

Mineral insulated cables over 2000 feet long, when operated in the temperature range of from about 200° C. to about 700° C., aside from manufacturing or installation defects, tend to fail due to one or two contributing causes. Magnesium oxide is the most prevalent cable insulant of mineral insulated cables in used today. It is well documented that magnesium oxide insulated cables' impedance decreases with increasing temperature. By Ohm's Law, for a given operating voltage, the leakage current from the cable conductor through the insulant will increase in proportion to the impedance decrease; this increased leakage current over time can result in cable failure. To achieve reliable operation in high temperature environments, applications typically limit the operating voltage based upon a safety factor of about 2 to 3 times the dielectric rating of the mineral insulated cable. This voltage derating either limits the application length or requires a thicker insulated cable at a higher cost; either of which affects the economic viability of applications, especially in the oil industry down-hole heater applications.

Another typical mineral insulated cable failure is instantaneous voltage breakdown failure when the cable is exposed to an overvoltage condition exceeding the dielectric rating of the cable insulant material. The overvoltage can be due to external causes, such as switching operations or lighting impulse propagation from the heater power source to the cable. An overvoltage condition can also be created by the reflecting voltage waves caused by the PWM voltage pulses of the Variable Speed Drive, common in motor applications with long feeder cables. Even with the typical drive output filter, the reflecting voltage waves can reach amplitudes multiple times that of the normal operating voltage, especially with cable lengths over 2000 feet, typical in the oil industry applications of mineral insulated cable as down-hole heaters.

Therefore, what is needed is a method to improve the reliability and range of use of mineral insulated electrical cables in high temperature environments.

SUMMARY

Some embodiments of the present disclosure include a system and method for improving the reliability and range of use of mineral insulated electrical cables in applications other than motor applications, such as in oil and gas industry down-hole heating applications. The system and method may include a voltage source, pulse width modulation (PWM) variable speed drive having an optimized operating frequency, which is optimized by a control process, a sine wave filter operatively connected to an output of the variable speed drive, the sine wave filter of a design optimized for the carrier frequency of the variable speed drive, a mineral insulated electrical heater cable operatively connected to the sine wave filter, and an external controller configured to receive voltage and current feedback from the sine wave filter and temperature feedback from the heater cable and to create a voltage set point at which the variable speed drive operates. The system and method may be configured to (i) mitigate a failure mechanism of mineral insulated cables over 2000 feet long, operating in medium voltage range between about 1000 volts and about 10,000 volts and in an operating temperature range of from about 200° C. to about 700° C.; (ii) extend the range of application of mineral insulated cables used as down-hole heaters by enabling operation at a voltage nearer the actual dielectric rating versus the derated operating voltage level required of present technology for reliable operation, thereby maximizing the economic viability of Oil and Gas Industry insitu oil recovery projects; and (iii) prevent reflected wave voltage spikes caused by the drive or power supply's PWM voltage pulses from causing damage to or failure of the insulant material of mineral insulated electrical heater cable when applied as a power supply for mineral insulated electrical heater cables.

BRIEF DESCRIPTION OF THE FIGURES

The detailed description of some embodiments of the invention is made below with reference to the accompanying FIGURE, wherein like numerals represent corresponding parts of the FIGURE.

FIGURE is a flow chart of one embodiment of the present invention.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The method of the present disclosure may be used to improve the reliability and range of operation of long mineral insulated electrical cables, operating in the medium voltage range, used in high temperature environments and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Power Transformer
2. Variable Speed Drive
3. Sine Wave Filter
4. Cable
5. External Controller The various elements of the control method to improve the reliability and range of operation of mineral insulated electrical cables of the present disclosure may be related in the following exemplary fashion. It is not intended to limit the scope or nature of the relationships between the various elements and the following examples are presented as illustrative examples only.

By way of example, and referring to FIGURE, some embodiments of the control method and system to improve the reliability and range of operation of mineral insulated electrical cables 16 of the present disclosure comprise a control process to optimize the setting of the operating frequency of the power supply, such as a voltage source pulse-width modulation (PWM) variable speed drive, for mineral insulated electrical cables 16, and the application of a sine wave filter 14 or a harmonics filter on the output of the power supply 12. Based on voltage, current, and temperature feedback provided to an external controller 18 from the sine wave filter 14 and the cables 16, the external controller 18 may create a voltage set point at which the variable speed drive may operate. In embodiments, the drive or power supply 12 may have the following minimum features: (i) a three phase voltage source inverter generates a three phase alternating current using one of many available PWM control algorithms; (ii) the minimum continuous operating frequency at full nameplate rated voltage and amperes may be at least about 1.5 Hz; (iii) the inverter or drive or power supply may be capable of configuration for a permanent fixed about 1.5 Hz operating frequency; (iv) the inverter or drive or power supply may be capable of configuration for a permanent fixed carrier frequency; and (v) the selected carrier frequency may not result in derating of the inverter or drive or power supply's nameplate output voltage and ampere ratings. In some embodiments, a transformer 10 may be needed before the inverter, drive, or power supply to convert the available site voltage to the inverter, drive, or power supply's voltage rating. For example, a step-up transformer (not shown) may be added between the sine wave filter and the mineral insulated electrical cables to improve the voltage range of application for mineral insulated electrical cables in the medium voltage range.

The control process for optimizing the operating frequency may comprise: (1) selecting a PWM Variable Speed Drive 12 having continuous voltage and current ratings of at least about 110% of that required for the mineral insulated electrical cables' application; (2) configuring the Drive 12 for V/f operating mode and by way of custom configuration, decouple Volts from frequency to enable setting the operating frequency to a fixed value, such that the Drive 12 output Voltage may be varied independently according to the drive set point; (3) disabling the motor features not applicable to the mineral insulated cables' application; (4) configuring the Drive 12 for a fixed carrier frequency; (5) configuring the Drive 12 for fixed operating frequency at the lowest level for which the Drive 12 can deliver full nameplate voltage and amperes continuously, such as at about 1.5 Hz or lower; and (6) setting the Drive 12 set point/command variable to the required drive voltage output for the mineral insulated cables to deliver desired heat rate. As a result of following these steps, a variable speed drive typically used for motor applications may be adapted for power and control of mineral insulated electrical cables used in applications such as electrical heating in the oil and gas industry, oil production and production flow assurance, transport pipeline flow assurance, and various process industry applications.

The control process may work by optimizing the setting of the operating frequency of the power supply for the mineral insulated electrical cables, normally about 1.5 Hz for a typical PWM variable speed drive. Following is the derived electrical impedance formula for mineral insulated cable that is the basis for the frequency setting established in this control process: $|Z|=\sqrt{R^2+(-1/2\pi f\, \varepsilon_r\, \varepsilon_o A/L)^2}$ where Z is impedance, R is resistance, f is frequency, $\varepsilon_r$ is relative permittivity of magnesium oxide (MgO), $\varepsilon_o$ is permittivity of free space, A is area of the cable, and L is length of cable. Note that the inductance of mineral insulated cable is insignificant compared to its capacitance and as such the inductance is ignored in the reactive component of the impedance formula. Lowering the operating frequency of the drive may increase the capacitance reactance, directly increasing the overall impedance and, therefore, resulting in a more reliable mineral insulated electrical cable, particularly in the operating temperature range of from about 200° C. to about 700° C. or more. Specifically, MgO is the most common insulant used in mineral insulated electrical cables. As the relative permittivity of MgO increases with temperature, the capacitive reactance decreases, as does the impedance. While the resistance is also affected by temperature, the temperature effect on overall impedance is dominated by the change in capacitive reactance. The frequency, if it can be lowered, may provide a direct offset to the increased permittivity affect, thereby increasing the overall impedance. For example, referring to the impedance formula, if the operating frequency is lowered from 60 Hz to 1.5 Hz with all other factors being held constant, the reactance component of impedance is increased by a factor of 40. The result may be a more reliable mineral insulated electrical cable versus prior art designs operation at about 50 Hz or 60 Hz frequency, for example in the operating temperature range of from about 200° C. to about 700° C. or more. Furthermore, the result may extend the range of operation of mineral insulated cable by enabling reliable operation at higher voltages, thus increasing the feasible length of cable applications, especially for Oil and Gas Industry down-hole heating applications The sine wave filter application may comprise: (1) specifying the sine wave filter 14 on the output of the power supply 12; (2) specifying the sine wave filter 14 for the carrier frequency range of the power supply 12; and (3) sizing the sine wave filter 14 for nameplate voltage and ampere rating of the power supply 12. By properly specifying the sine wave filter on the output of a variable speed drive or power supply, the mineral insulated electrical cables may be protected from reflected wave voltage spikes caused by the drive or power supply's PWM voltage pulses. In embodiments, the sine wave filter may have the following minimum features: (i) the sine wave filter may be specified for the carrier frequency range of the drive or power supply; and (ii) the sine wave filter may be sized for the nameplate voltage and ampere rating of the drive or power supply. The method may also comprise using a power transformer 10, as needed, to match the voltage of the PWM drive 12.

The present disclosure also includes a system for improving the reliability and range of application of mineral insulated electrical cables 16 for use in applications other than motor applications, such as in the Oil and Gas Industry down-hole heater applications, the system comprising a pulse width modulation variable speed drive 12, a sine wave filter 14 operatively connected to an output of the variable speed drive, the sine wave filter configured to filter PWM pulses from the variable speed drive 12, a mineral insulated electrical heater cable 16 operatively connected to the sine wave filter 14; and an external controller 18 configured to receive voltage and current feedback from the sine wave filter and temperature feedback from the heater cable and to create a voltage set point at which the variable speed drive operates. In some embodiments, the mineral insulated electrical heater cable 16 has a length of at least about 2000 feet and operates in the medium voltage range of from about 1000 volts to about 10,000 volts.

In embodiments, the external controller 18 may comprise any suitable external controller, such as a programmable logic controller (PLC) or a distributed control system (DCS), or a heater cable controller, any of which may be custom programmed for the mineral insulated (MI) heater cable application. The external controller 18 may be chosen based on the application, the preference, and the infrastructure of the application site.

The system and method of the present invention may (i) address or mitigate a dominant failure mechanism of mineral insulated cables in the operating temperature range of from about 200° C. to about 700° C. or more and in the medium voltage operating range of from about 1000 volts to about 10,000 volts; and (ii) prevent reflected wave voltage spikes due to the PWM voltage pulses of variable speed drives from causing damage to or failure of the insulant material of mineral insulated electrical heater cable when applied as a power supply for mineral insulated electrical heater cables.

Persons of ordinary skill in the art may appreciate that numerous design configurations may be possible to enjoy the functional benefits of the inventive control process and systems. Thus, given the wide variety of configurations and arrangements of embodiments of the present invention the scope of the invention is reflected by the breadth of the claims below rather than narrowed by the embodiments described above.

What is claimed is:

1. A method to improve the application of a mineral insulated electrical cable comprising:
   selecting a pulse width modulation variable speed drive;
   selecting a V/f operating mode on the pulse width modulation variable speed drive;
   decoupling a voltage control from a frequency control with the pulse width modulation variable speed drive, wherein the frequency is set to a fixed value and the voltage is varied independently from the frequency in the V/f operating mode;
   selecting a set point/command variable of the pulse width modulation variable speed drive to a drive voltage output for the mineral insulated electrical cable to deliver a desired heat rate; and
   applying a sine wave filter on an output of the pulse width modulation variable speed drive wherein the sine wave filter is operatively connected to the mineral insulated electrical cable.

2. The method of claim 1, further comprising:
   sizing the pulse width modulation variable speed drive to a continuous voltage and current ratings of at least 110% of that required for a desired application of the mineral insulated electrical cables to enable continuous 1.5 Hz frequency operation;
   disabling motor features not applicable to the desired application of the mineral insulated electrical cables;
   configuring the variable speed drive for a optimized fixed carrier operating frequency; and
   setting the variable speed drive set point/command variable to the drive voltage output for the mineral insulated electrical cables to deliver a desired heat rate.

3. The method of claim 2, wherein:
   the optimized fixed carrier operating frequency is 1.5 Hz;
   the desired heat rate exposes the mineral insulated electrical cable to a temperature environment from 200° C. to 700° C.; and
   the operating voltage of the mineral insulated electrical cable is from 1000 volts to 10,000 volts, depending on the desired heat rate and physical properties of the cable.

4. The method of claim 1, further comprising:
   specifying the sine wave filter on the output of the pulse width modulation variable speed drive;
   specifying the sine wave filter for a carrier frequency range of the pulse width modulation variable speed drive; and
   sizing the sine wave filter for nameplate voltage and ampere rating of the pulse width modulation variable speed drive.

5. The method of claim 1, wherein the mineral insulated electrical cable is at least 2000 feet long.

6. A system for improving the reliability and range of operation of a mineral insulated electrical cable comprising:
   a pulse width modulation variable speed drive, wherein the pulse width modulation variable speed drive operates at a fixed frequency and a voltage that is varied independently from the frequency in a V/f operating mode;
   a sine wave filter operatively connected to an output of the variable speed drive, the sine wave filter designed to filter pulse width modulation (PWM) voltage pulses from the variable speed drive;
   a mineral insulated electrical cable operatively connected to the sine wave filter, wherein the mineral insulated electrical cable operates in a temperature range from 200° C. to 700° C.; and,
   an external control configured to receive the voltage and a current feedback from the sine wave filter and a temperature feedback from the mineral insulated electric cable and to create a voltage set point at which the pulse width modulation variable speed drive operates; and
   wherein the sine wave filter prevents reflective wave voltage spikes from causing damage to or failure of the insulant material of mineral insulated electrical cable.

7. The system of claim 6, wherein the mineral insulated electrical cable has a length of at least 2000 feet.

8. The system of claim 6, wherein the pulse width modulation variable drive is operable to:
   operate in a V/f operating mode;
   decouple a voltage control from a frequency control, wherein the frequency is set to a fixed value and the voltage is varied independently from the frequency in the V/f operating mode; and
   select a set point/command variable to a drive voltage output for the mineral insulated electrical cable to deliver a desired heat rate.

9. The method of claim 6, wherein:
   the sine wave filter is designed for an optimized fixed carrier frequency within the range of the pulse width modulation variable speed drive;
   the variable speed drive is configured for an optimized fixed carrier frequency;
   the optimized fixed carrier frequency is determined in consideration of factors that influence the carrier frequency effect on size and cost of the sine wave filter and the life-cycle effect on the pulse width modulation variable speed drive power components; and
   the sine wave filter is sized for nameplate voltage and ampere rating of the pulse width modulation variable speed drive.

* * * * *